US006185525B1

(12) United States Patent
Taubenheim et al.

(10) Patent No.: US 6,185,525 B1
(45) Date of Patent: Feb. 6, 2001

(54) METHOD AND APPARATUS FOR DIGITAL SIGNAL COMPRESSION WITHOUT DECODING

(75) Inventors: David B. Taubenheim, Boynton Beach; Miriam R. Boudreaux, Boca Raton; Sunil Satyamurti, Lake Worth, all of FL (US)

(73) Assignee: Motorola, Schaumburg, IL (US)

( * ) Notice: Under 35 U.S.C. 154(b), the term of this patent shall be extended for 0 days.

(21) Appl. No.: 09/170,744

(22) Filed: Oct. 13, 1998

(51) Int. Cl.[7] .............................. G10L 21/04; H04B 1/66

(52) U.S. Cl. .......................... 704/211; 704/504; 379/88.1

(58) Field of Search .................................... 704/201, 219, 704/500, 501, 503, 504, 208, 211, 214, 215; 375/240; 379/88.07, 88.1

(56) References Cited

U.S. PATENT DOCUMENTS 4,330,689 * 5/1982 Kang et al. .......................... 704/219
4,791,660 * 12/1988 Oye et al. .......................... 379/88.1
5,506,872 * 4/1996 Mohler ................................ 375/240
5,675,333 * 10/1997 Boursier et al. .................. 379/88.07
5,682,462 10/1997 Huang et al. ........................ 704/219
5,715,367 * 2/1998 Gillick et al. ........................ 704/254
5,864,792 * 1/1999 Kim .................................... 704/208
5,881,104 * 3/1999 Akahane .............................. 375/240
5,974,387 * 10/1999 Kageyama et al. .................. 704/500
5,978,757 * 11/1999 Newton ............................... 704/217

* cited by examiner

*Primary Examiner*—Tālivaldis I. Šmits
*Assistant Examiner*—Martin Lerner
(74) *Attorney, Agent, or Firm*—Pablo Meles

(57) ABSTRACT

A method (100) of compressing a digital signal that is parametrically modeled and encoded includes the steps of storing (102) the digital signal in a memory in a plurality of frames having a plurality of parameters in each frame of the plurality of frames, wherein the digital signal was encoded at a higher rate and converting the digital signal to a lower rate by selecting (106) from each frame of the plurality of frames a subset of the plurality of parameters and discarding (108) the subset of the plurality of parameters within each frame of the plurality of frames.

11 Claims, 4 Drawing Sheets

100

10

HIGHER RATE MESSAGE

12

HIGHER RATE FRAME

LOWER RATE ANCHOR FRAME (VOICED)

14

16 LOWER RATE INTERMEDIATE FRAME (VOICED)

UNVOICED ANCHOR FRAME

18

UNVOICED INTERMEDIATE FRAME

20

METHOD AND APPARATUS FOR DIGITAL SIGNAL COMPRESSION WITHOUT DECODING

FIELD OF THE INVENTION

The present invention is directed to digital signal compression, and more particularly to a decoder or vocoder capable of compressing digital signals that are parametrically modeled and encoded.

BACKGROUND OF THE INVENTION

Mobile communication products continue to push the envelope in size and capabilities. Memory optimization of stored digital data is therefore vital in addressing the current and future demands of users of such products. Voice, video and multimedia signals are memory intensive. Compression schemes for such signals can become quite complex with resulting uncompressed signals that fall below acceptable standards in intelligibility or uncompressed data lengths that are still too large to provide a significant advantage in memory space savings. Thus, what is needed is a compression scheme for a stored digital signal that simply reduces the size of the stored digital signal while maintaining intelligibility and a significant savings in memory space in an uncompressed mode.

DETAILED DESCRIPTION

Figure 1:
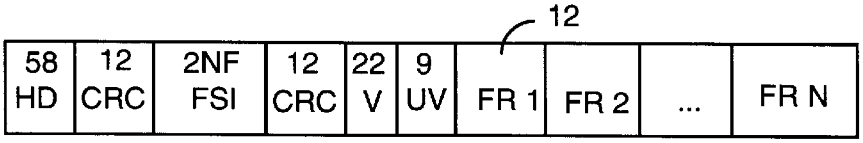
FIG. 1 is a representation of a higher rate message in accordance with the present invention.

Any digital signal that can be modeled and parametrically encoded would be an exemplary signal that could be compressed or converted and subsequently recreated in accordance with benefits of the present invention. Although the emphasis of the present disclosure is with regards to digital speech signals that can be modeled and parametrically encoded, it should be understood that other signals such as digitally stored video signals may equally benefit from the present invention.

With respect to digital speech signals, a multi-rate vocoder is preferably used in the process of recreating speech. The vocoder preferably has a speech synthesizer that initially performs the function of decoding a binary stream of data into sets of speech model parameters and then subsequently converts the parameters into synthesized speech. Preferably, the multi-rate vocoder is a multi-band Excitation (MBE) vocoder where the analysis, coding, and synthesis of speech is based on the segmentation of the speech into fixed length segments. Synthesis of the speech preferably proceeds frame-by-frame, using a distinct set of model parameters for each frame. Efficient use of the model parameters requires an understanding of the underlying assumptions of the nature of human speech.

The primary assumption about speech is that it is often highly periodic and its spectral characteristics change gradually. This is the basis for selecting a fixed-length frame in a vocoder scheme. Of course there are times when speech characteristics do change rapidly. High rate coders with shorter update intervals generally outperform very low rate coders in these circumstances. Thus, pseudo-periodic speech is referred to as "voiced" and a periodic speech is referred to as "unvoiced." Generally, speech consists of mixtures of voiced and unvoiced spectral components and a typical vocoder would process the voiced and unvoiced portions of a speech signal separately to efficiently model and encode the signal and then subsequently combine the signals in re-creating the speech.

The sets of speech model parameters that maybe within a frame of data could include a frame voicing flag, a fundamental frequency value, band voicing vectors, line spectrum frequencies or spectral parameters, as well as gain. A frame voicing flag would indicate whether a voiced component is present within a given frame and whether the frame data itself would be in a voiced or unvoiced format. The fundamental frequency in voiced speech represents the pitch frequency or the frequency at which the pitch cycles are repeated. Since there is no true fundamental frequency in unvoiced speech, an arbitrary value can be assigned and used for decoding the spectral shape of the unvoiced speech segment. The band voicing vector breaks up the speech signal into a plurality of spectral bands having predefined frequency ranges. Line spectrum frequencies (LSFs) or spectral parameters provide values that are used to encode the spectrum which will be used to generate the synthesized speech signal. The harmonic spectrum shape derived from the LSFs should be scaled by the gain to represent the correct frame energy.

Thus, a typical vocoder as described above can be used to synthesize speech from three data rates: 600, 1000, or 1400 bits per second for example. While these rates are remarkable and allow a large amount of speech to be stored in memory, the present invention is primarily directed to a method to optimize the memory usage within an electronic device such as a selective call receiver or messaging unit.

Figure 2:
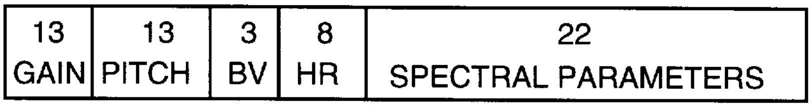
FIG. 2 is a representation of a frame in a higher rate message in accordance with the present invention.
Figure 3:
FIG. 3 is a representation of a voiced anchor frame in a lower rate message in accordance with the present invention.
Figure 4:
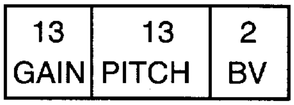
FIG. 4 is a representation of an voiced intermediate frame in a lower rate message in accordance with the present invention.
Figure 5:
FIG. 5 is a representation of an unvoiced anchor frame for any rate in accordance with the present invention.
Figure 6:
FIG. 6 is a representation of an unvoiced intermediate frame in accordance with the present invention.

FIG. 1 shows a typical higher rate message bitstream organization 12. (Since frames may be either voiced or unvoiced, bit lengths are not shown for Frames 1 . . . N.). FIG. 2 illustrates the bit designations for a higher rate voiced frame 12. As shown in FIG. 3, a voiced lower rate anchor frame 14 has 2 bits in the BV field, no Harmonic Residue (HR), and may contain less spectral parameters or LSFs. FIG. 4 illustrates the bit designations for a voiced lower rate intermediate frame 16 wherein this frame essentially has the same format as the voiced lower rate anchor frame 14 except that the spectral parameters or LSFs are discarded. FIG. 5 shows the bit fields for an unvoiced anchor frame 18 for any rate while FIG. 6 shows a unvoiced intermediate frame 20. The notion of anchor frames and intermediate frames become apparent with an understanding of segmentation. Segmentation is the process of choosing representative frames (the anchor frames) and their respective spectral parameters while discarding the spectral parameters for the intermediate frames by means of a spectral distortion metric. Thus, a voiced segment of a stored voice signal that has been compressed to a lower rate may contain a lower rate anchor frame 14 followed by a predetermined number of lower rate intermediate frames 16 and bounded by another lower rate anchor frame 14. Likewise, an unvoiced segment of a stored voice signal that has been compressed to a lower rate may contain an unvoiced anchor frame 18 followed by a predetermined number of unvoiced intermediate frames 20 and bounded by another unvoiced anchor frame 18.

Looking at the bit designations within the frames in further detail, the 13 bits in the gain field of a voiced or unvoiced frame are valid for any rate. Therefore, all 13 are copied into the lower rate bitstream from the higher bitstream. (A parameter decoder in a messaging unit handles how to partition the gain into left- or right-half energies according to the rate.) Likewise, the 13 bits in the pitch field are copied for voice frames from the higher rate to the lower rate bitstream. With respect to band voicing (BV), a voiced frame's spectrum is preferably sectioned into four bands, each of which carries a voiced/unvoiced flag. In this example, the digital signal is parametrically modeled so that the first band is always voiced, so BV1=1 always. The second, third, and fourth bands may or may not be voiced. Therefore, a higher rate frame may carry the voicing status of bands 2, 3, and 4 explicitly as three bits: BV2, BV3, BV4. On the other hand, a lower rate frame can contain less information, preferably only bits BV2 and BV3. This means that the rate conversion algorithm will simply not copy BV4 from the higher rate bitstream. A parameter decoder would know to set BV4 to BV3 when a lower rate message is decoded. With respect to Harmonic Residue (HR), Harmonic residues are not used in lower rate messages and are not copied from the higher rate bitstream to the lower rate bitstream, resulting in a reduction of data. When a lower rate message is played, zeroes are passed to a synthesizer from a parameter decoder. With respect to spectral parameters such as Line Spectrum Frequencies (LSFs), a lower bit rate can be achieved with a lower rate message since a lower rate message contains fewer explicit sets of LSFs than a higher rate message, which contains explicit LSFs because each frame is an anchor frame. It is important to the voice quality of the message to choose appropriate LSFs from the higher rate bitstream to represent the content of the voice message well at the lower rate. Representative LSFs from the higher rate bitstream are preferably chosen according to a distortion-minimizing routine. Once the representative LSFs have been determined, the FSI block is updated accordingly.

An electronic device such as a selective call receiver or transceiver having a memory for storing digital signals that are parametrically modeled and encoded and capable of compressing the digital signals in accordance with the present invention would preferably comprise a processor such as a multi-rate vocoder programmed to store the digital signal in the memory in a plurality of frames wherein each frame has a plurality of parameters and wherein the digital signal was encoded at a higher rate. Then, the processor would preferably convert the digital signal to a lower rate by selecting a subset of parameters from each of the plurality of frames and discard the subset of the plurality of parameters within each of the frames of the plurality of frames. The processor can be further programmed to selectively compress the digital signal by selecting an additional subset of parameters from each frame of the plurality of frames and discarding the additional subset of parameters within each frame of the plurality of frames.

Figure 7:
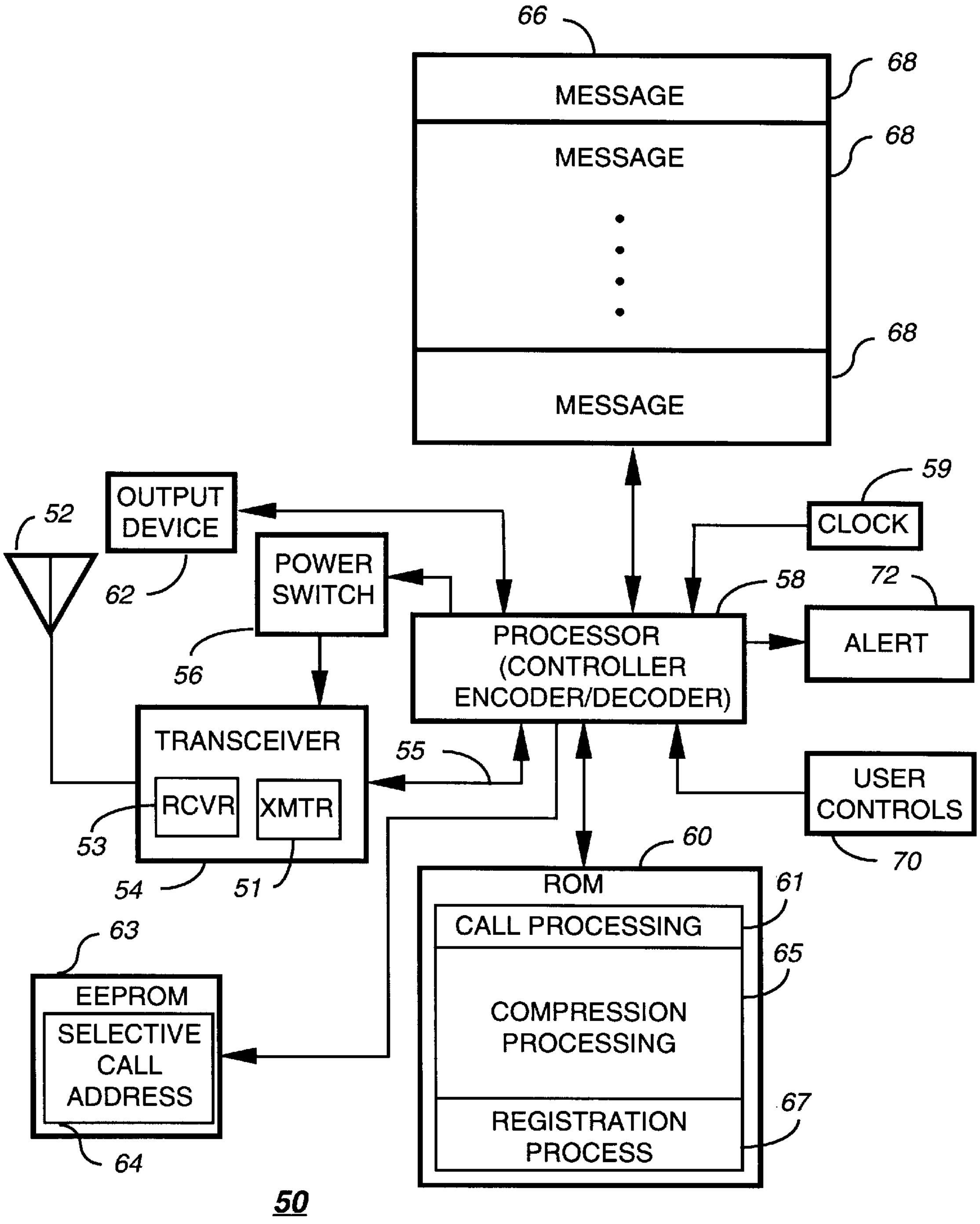
FIG. 7 is a block diagram of an electronic device such as a selective call receiver in accordance with the present invention.

Referring to FIG. 7, an electrical block diagram depicts an electronic device such as communication device 50 which may be embodied as a selective call receiver or transceiver or portable subscriber unit (PSU) in accordance with the present invention. The portable subscriber unit comprises a transceiver antenna 52 for transmitting and intercepting radio signals to and from base stations (not shown). The radio signals linked to the transceiver antenna 52 are coupled to a transceiver 54 comprising a conventional transmitter 51 and receiver 53. The radio signals received from the base stations preferably use conventional two and four-level FSK modulation, but other modulation schemes could be used as well. It will be appreciated by one of ordinary skill in the art that the transceiver antenna 52 is not limited to a single antenna for transmitting and receiving radio signals. Separate antennas for receiving and transmitting radio signals would also be suitable.

Radio signals received by the transceiver 54 produce demodulated information at the output. The demodulated information is transferred over a signal information bus 55 which is preferably coupled to the input of a processor 58, which processes the information in a manner well known in the art. Similarly, response messages including acknowledge response messages are processed by the processor 58 and delivered through the signal information bus 55 to the transceiver 54. The response messages transmitted by the transceiver 54 are preferably modulated using four-level FSK operating at a bit rate of ninety-six-hundred bps. It will be appreciated that, alternatively, other bit rates and other types of modulation can be used as well.

A conventional power switch 56, coupled to the processor 58, is used to control the supply of power to the transceiver 54, thereby providing a battery saving function. A clock 59 is coupled to the processor 58 to provide a timing signal used to time various events as required in accordance with the present invention. The processor 58 also is preferably coupled to a electrically erasable programmable read only memory (EEPROM) 63 which comprises at least one selective call address 64 assigned to the portable subscriber unit 18 and used to implement the selective call feature. The processor 58 also is coupled to a random access memory (RAM) 66 for storing the at least a message in a plurality of message storage locations 68. Of course, other information could be stored that would be useful in a two-way messaging system such as zone identifiers and general purpose counters to preferably count calls (to and from the PSU).

The communication device 50 in the form of a two-way messaging unit may also comprise a transmitter coupled to a encoder and further coupled to the processor 58. It should be understood that the processor 58 in the present invention could serve as both the decoder and encoder.

When an address is received by the processor 58, the call processing element 61 preferably within a ROM 60 compares the received address with at least one selective call addresses 64, and when a match is detected, a call alerting signal is preferably generated to alert a user that a message has been received. The call alerting signal is directed to a conventional audible or tactile alert device 72 coupled to the processor 58 for generating an audible or tactile call alerting signal. In addition, the call processing element 61 processes the message which preferably is received in a digitized conventional manner, and then stores the message in the message storage location 68 in the RAM 66. The message can be accessed by the user through conventional user controls 70 coupled to the processor 58, for providing functions such as reading, locking, and deleting a message. Alternatively, messages could be read through a serial port (not shown). For retrieving or reading a message, an output device 62, e.g., a conventional liquid crystal display (LCD), preferably also is coupled to the processor 58. It will be appreciated that other types of memory, e.g., EEPROM, can be utilized as well for the ROM 60 or RAM 66 and that other types of output devices, e.g., a speaker, can be utilized in place of or in addition to the LCD, particularly in the case of receipt of digitized voice. The ROM 60 also preferably includes elements for handling the registration process (67) and for compression processing (65) among other elements or programs.

A method in accordance with the present invention would preferably convert a higher rate message to a lower rate message within the messaging unit. The conversion is preferably done before the message is decoded. Alternatively, portions of the conversion can be done before decoding and the remaining portion of the conversion can be done after decoding. The vocoder system envisioned for use with the present invention would store voice data as a bit-packed stream of parameters which are later used to re-create a person's voice. More parameters are contained within a higher rate message (such as the 1400 bps or rate 3 message) than in a lower rate message (such as the 1000 bps or rate 2 message or the 600 bps or rate 1 message), thus accounting for the rate and quality increase. (Please note that the number of bits associated with each rate are approximate and represent the average message.) Thus, memory savings can be achieved by converting down the rate of the message by effectively reducing the number of parameters stored with only a slight reduction in the resultant speech quality.

For example, the average 10 second rate 3 message occupies 875 words of memory, assuming 16 bit words:

10 seconds*1400 bits/second*1 word/16 bits=875 words

By converting that 10 second message at rate 1, the memory usage becomes:

10 seconds*600 bits/second*1 word/16 bits=375 words

This results in an average savings of approximately 55%. Of course, as previously mentioned, there is a slight loss of voice quality associated with reducing the rate. However, the reduction may be applied judiciously, as described later. Further, a rate reduction may take place from rate 3 to rate 2, or from rate 2 to rate 1.

A method in accordance with the present invention preferably converts a higher rate message to a lower rate message before reconstruction takes place by the vocoder. This significantly reduces the processing required to eventually regenerate the voice message and also provides for a higher quality message in comparison to a message using a method where the message is fully reconstructed and then converted to a lower rate. More specifically, parametric values can be extracted, discarded or at least reduced from the bit-packed stream of parameters received without ever decoding. It should be understood that further parametric values can be discarded or reduced after decoding as well.

Figure 8:
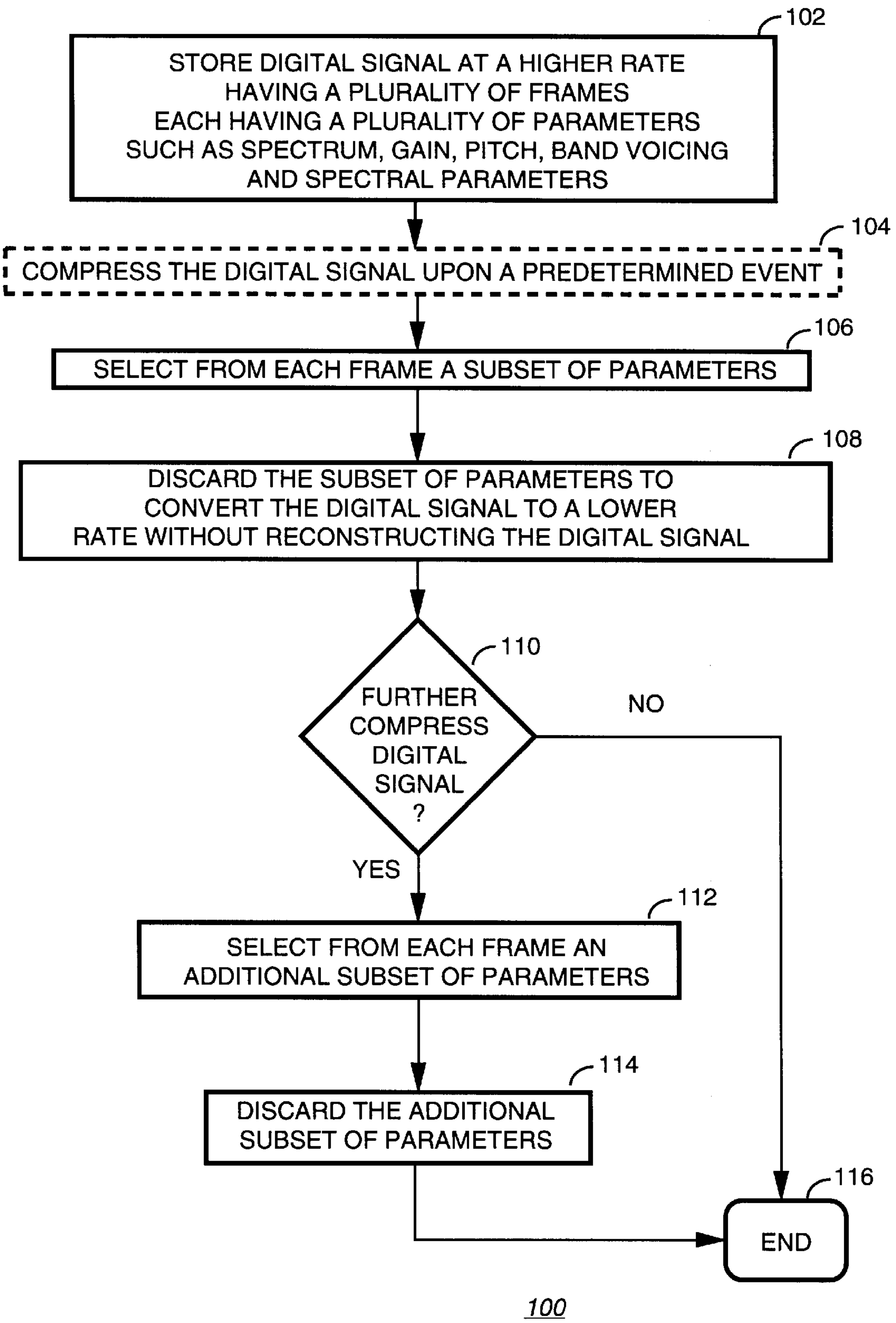
FIG. 8 is a flow chart illustrating a method of compressing a digital signal in accordance with the present invention.

Referring to FIG. 8, in one aspect of the present invention, a method 100 of compressing a digital signal that is parametrically modeled and encoded at a higher rate preferably comprises the steps of storing at step 102 the digital signal in a memory in a plurality of frames having a plurality of parameters in each frame of the plurality of frames and converting the digital signal to a lower rate by selecting at step 106 from each frame of the plurality of frames a subset of the plurality of parameters and discarding at step 108 the subset of the plurality of parameters within each frame of the plurality of frames. The plurality of parameters can be selected from the group consisting of spectrum, gain, pitch, spectral parameters, and band voicing and the conversion of the digital signal to a lower rate is preferably achieved without reconstructing the signal. The conversion could further comprise the step of segmentation by choosing representative frames and respective spectral parameters for the plurality of frames as previously explained above. The conversion may also comprise the step of copying at least portions of gain, pitch, band voicing, and spectral parameters from the higher rate to the slower rate until the end of the message. The digital signal can be further compressed at decision block 110 by selecting at step 112 an additional subset of parameters from each frame of the plurality of frames and discarding at step 114 the additional subset of parameters within each frame of the plurality of frames. All these steps can occur in an electronic device such as a selective call unit, telephone answering device, or dictation device preferably having a vocoder.

In applying a method in accordance with the present invention, there are several situations when a digital voice message could be compressed. Thus compression of the digital signal can be predicated upon a predetermined event as shown at step 104. For example, a predetermined event could be a user's request. The "Compress message" command could easily be implemented in a menu screen of an electronic device such as a pager. Other examples could include compressing automatically the oldest message or messages or automatically compressing messages when a memory is full or approaching a predefined percentage of full capacity. Message(s) over a predetermined number of days old or which has/have not been played/replayed for a predetermined number of days may be compressed automatically. Additionally, any audio information service message in memory may be compressed if memory has reach a predetermined capacity. If a memory is nearly full, an incoming message can be compressed in real-time. The compression algorithm could also be set to compress memory to a predetermined percentage of its present size. A user may even set the compression criterion for a message or series of messages attempting to balance intelligibility or quality versus space savings. The present invention ultimately allows for the option of selecting to keep or discard parameters to achieve a desired compression goal.

Figure 9:
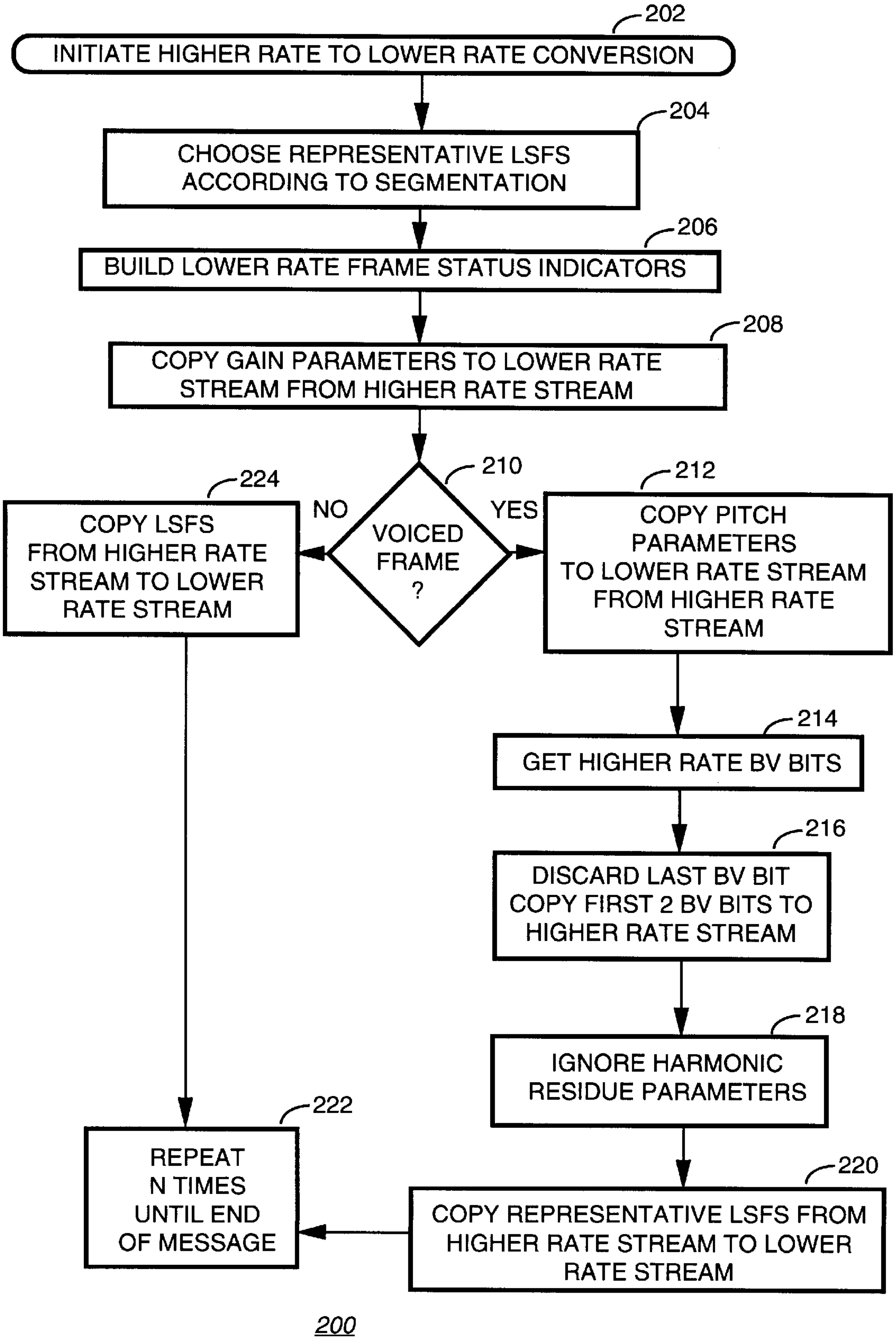
FIG. 9 is another flow chart illustrating a method of compressing a digital signal in accordance with the present invention.

A summary of the algorithm used to change a voice message from a higher rate to a lower rate is outlined in the method 200 in FIG. 9 below. The first step is to initialize the lower rate message in the unit's memory at step 202 by beginning to compose its header (HD). The first two bits of the HD contain the rate indicator (R). Thus, a change from 1400 bps to 600 bps, R is written as 01. Much of the rest of the data contained in the higher rate header is to be also used in the lower rate header: bits which encode the number of frames in the current message, the number of voiced frames, the mean fundamental frequency, and the mean values of the odd line spectrum frequencies (LSFs) of the voiced frames. At step 204, representative spectral parameters such as LSFs are chosen according to segmentation as previously explained above. At step 206, the Frame Status Indicators (FSI) for the lower rate bit stream is built. The Frame Status Indicators (FSI) describe which frames are voiced or unvoiced. The FSI block of higher rate messages contains one bit per frame, since all higher rate frames are explicit (i.e. no interpolation of LSFs). However, since lower rate messages contain explicit and interpolated frames, the FSI block requires two bits per frame. The conversion process determines which frames are to be explicit or interpolated, so the two FSI bits are set. At step 208, the gain parameters from the higher rate message bit stream is copied to the lower rate message bitstream. Next, at the decision block 210, if the frame is voiced, the pitch parameters from the higher rate message bitstream is copied over to the lower rate message bitstream. At steps 214 and 216, the higher rate message band voicing bits are retrieved with the last band voicing bit discarded. The remaining band voicing bits are then copied to the lower rate message bit stream. The higher rate harmonic residue bits are ignored at step 218 and therefore not copied to the lower rate message bit stream. At step 220, representative spectral parameters are copied from the higher rate message bitstream to the lower rate message bit stream. The process described above is repeated for each frame until the end of message is reached as shown at step 222. At decision block 210, if the frame was unvoiced, then only the spectral parameters are copied from the higher rate message bit stream to the lower rate message bit stream at step 224 until the end of message is reached as shown at step 222. Once the voice message is compressed from a higher rate to a lower rate in accordance with the present invention a multi-rate vocoder can then reconstruct the voice signal from the lower rate parameters and thereby achieve the desired memory savings.

The above description is intended by way of example only and is not intended to limit the present invention in any way except as set forth in the following claims.

What is claimed is:

1. A method of compressing a digital signal that is parametrically modeled and encoded comprising the steps of:

storing the digital signal in a memory in a plurality of frames having a plurality of parameters in each frame of the plurality of frames, wherein the digital signal was encoded at a higher rate;

determining if the digital signal in the memory is of a predetermined message type;

upon determining that the digital signal is of the predetermined message type, automatically converting the digital signal to a lower rate by selecting from each frame of the plurality of frames a subset of the plurality of parameters and discarding the subset of the plurality of parameters within each frame of the plurality of frames.

2. The method of claim 1, wherein the method further comprises a method of compressing a digital voice signal having parameters selected from the group consisting of spectrum, gain, pitch, spectral parameters, and band voicing.

3. The method of claim 1, wherein the method further comprises the step of converting the digital signal to a lower rate without reconstructing the signal.

4. The method of claim 1, wherein the method further comprises the step of further compressing the digital signal by selecting an additional subset of parameters from each frame of the plurality of frames and discarding the additional subset of parameters within each frame of the plurality of frames.

5. A method of compressing upon a predetermined event a stored digitally encoded voice message stored in a plurality of frames in a memory within a subscriber unit having a vocoder, comprising the steps of:

determining if the stored digitally encoded voice message is of a predetermined message type;

upon determining that the stored digitally encoded voice message is of the predetermined message type, automatically converting the stored digitally encoded voice message that was encoded at a first rate in the plurality of frames to a stored digitally encoded voice message at a second rate, wherein the second rate is lower than the first rate, wherein the conversion comprises the steps of:

selecting a subset of a plurality of parameters with each of the plurality of frames; and discarding the subset of the plurality of parameters residing within the plurality of frames.

6. The method of claim 5, wherein the step of converting further comprises the step of segmentation by choosing representative spectral parameters for a number of the plurality of frames.

7. The method of claim 5, wherein the step of converting further comprises the step of copying at least portions of gain, pitch, band voicing, and spectral parameters from the first rate to the second rate until the end of the message.

8. The method of claim 5, wherein the predetermined event comprises determination of information services message(s) stored in the subscriber unit, whereupon the step of converting comprises the step of automatic compression of at least information service message(s) when the memory in the subscriber unit exceeds a threshold percentage of its storage capacity.

9. An electronic device having a memory for storing digital signals that are parametrically modeled and encoded and capable of compressing the digital signals, comprises:

a processor programmed to:

determine if the digital signal in the memory is of a predetermined message type;

store the digital signal in the memory in a plurality of frames wherein each frame has a plurality of parameters and wherein the digital signal was encoded at a high rate;

upon determining that the digital signal is of the predetermined message type, automatically convert the digital signal to a lower rate by selecting a subset of parameters from each of the plurality of frames and discarding the subset of the plurality of parameters within each of the frames of the plurality of frames.

10. The electronic device of claim 9, wherein the electronic device is a selective call receiver and the processor is a vocoder.

11. The electronic device of claim 9, wherein the processor is further programmed to selectively further compress the digital signal by selecting an additional subset of parameters from each frame of the plurality of frames and discarding the additional subset of parameters within each frame of the plurality of frames.

* * * * *